(12) United States Patent
Okada (10) Patent No.: US 8,817,333 B2
(45) Date of Patent: Aug. 26, 2014

(54) DISPLAY DEVICE WITH OPTICAL SENSOR INCLUDED AND IMAGE READING METHOD EMPLOYING SAME

(75) Inventor: Atsushi Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/995,622

(22) PCT Filed: Dec. 14, 2011

(86) PCT No.: PCT/JP2011/078922
§ 371 (c)(1),
(2), (4) Date: Jun. 19, 2013

(87) PCT Pub. No.: WO2012/086493
PCT Pub. Date: Jun. 28, 2012

(65) Prior Publication Data
US 2013/0265616 A1 Oct. 10, 2013

(30) Foreign Application Priority Data
Dec. 20, 2010 (JP) .................. 2010-283508

(51) Int. Cl.
*H04N 1/00* (2006.01)
*H04N 1/04* (2006.01)
*H04N 1/195* (2006.01)
*G06F 3/041* (2006.01)

(52) U.S. Cl.
CPC ......... *H04N 1/00129* (2013.01); *H04N 1/0461* (2013.01); *H04N 1/19515* (2013.01); *G06F 3/0412* (2013.01)
USPC ........ 358/406; 358/1.13; 358/1.15; 358/1.16; 358/1.18; 358/504; 345/175; 345/76; 345/87

(58) Field of Classification Search
None
See application file for complete search history.

(56) References Cited

U.S. PATENT DOCUMENTS

| 6,791,721 B1* | 9/2004 | Konogaya et al. ............. 358/474 |
| 6,891,645 B1* | 5/2005 | Nakamura .................... 358/474 |
| 8,188,441 B2* | 5/2012 | Sheng et al. ............. 250/370.08 |
| 2004/0008172 A1 | 1/2004 | Nakamura et al. |
| 2009/0102823 A1* | 4/2009 | Tateuchi ........................ 345/204 |
| 2010/0220077 A1* | 9/2010 | Fukunaga et al. ............. 345/175 |
| 2011/0050650 A1* | 3/2011 | McGibney et al. ........... 345/175 |

FOREIGN PATENT DOCUMENTS

JP 2004-153329 A 5/2004

* cited by examiner

*Primary Examiner* — Miya J Cato
(74) *Attorney, Agent, or Firm* — Chen Yoshimura LLP (57) ABSTRACT

Provided is a display device with photosensors that can achieve a scanner function without increasing the memory capacity for images. A display device with photosensors includes a visible light source and an invisible light source. The display device with photosensors further includes: a first photosensor that detects the amount of received light in a pixel region when the invisible light source is on; a second optical sensor that detects the amount of received light in the pixel region when the invisible light source is off; and a third photosensor that detects the amount of received light reflected from an object to be scanned, causing only display pixels respectively nearest to the third photosensors within a prescribed range in the pixel region to be in a display state, and causing other pixels in the prescribed range to be in a non-display state. Data obtained from the third photosensor is stored in a memory (205) including a region (205a) that stores therein first reference data obtained when the invisible light source is on, and a region (205b) that stores therein second reference data obtained when the invisible light source is off.

7 Claims, 10 Drawing Sheets

DISPLAY DEVICE WITH OPTICAL SENSOR INCLUDED AND IMAGE READING METHOD EMPLOYING SAME

TECHNICAL FIELD

The present invention relates to a display device with photosensors that has a scanner function for scanning an image from a document and the like by having photosensors incorporated therein.

BACKGROUND ART

A display device with photosensors that can detect the brightness of ambient light or scan an image of an object placed near the display has been disclosed. Such a display device achieves these functions by having photosensors such as photodiodes, for example, incorporated in a pixel region thereof. In recent years, in particular, there is an increasing demand for a so-called scanner function that makes it possible to read an image from a document and the like placed on the front surface of the display of the display device with photosensors.

A conventional display device with photosensors that can read an image is disclosed in Japanese Patent Application Laid-Open Publication No. 2004-153329, for example.

In the display device with photosensors having a scanner function, an image for one frame is composed based on outputs from a plurality of photosensors disposed in the pixel region. Therefore, it is necessary to have an image memory that can store data for one frame.

SUMMARY OF THE INVENTION

The present invention is aiming at providing a display device with photosensors that can realize a scanner function without increasing the capacity of a memory for storing images.

In order to achieve the above-mentioned object, a display device with photosensors according to the present invention includes: a visible light source that radiates visible light to a pixel region; an invisible light source that radiates invisible light to the pixel region; a light source control circuit that turns on and off the invisible light source; first photosensors that detect an amount of received light when the invisible light source is on; second photosensors that detect an amount of received light when the invisible light source is off; and a memory that has a first region and a second region, the first region storing first reference data obtained from each of the first and second photosensors when the invisible light source is on, the second region storing second reference data obtained from each of the first and second photosensors when the invisible light source is off. The display device with photosensors further includes: a calibration circuit that calibrates data obtained from the first photosensors and the second photosensors when the invisible light source is on and off, respectively, by using the data stored in the first region and the second region; and third photosensors that detect an amount of light reflected by an object to be scanned that is placed on the pixel region, by turning the invisible light source off and the visible light source on, and by causing only display pixels respectively nearest to the third photosensors within a prescribed range in the pixel region to be in a display state, and causing other display pixels within the range to be in a non-display state. Data obtained by the third photosensors is overwritten in one of the first region and the second region of the memory.

With this configuration, it is possible to provide a display device with photosensors that can realize a scanner function without increasing the capacity of the memory for storing images.

DETAILED DESCRIPTION OF EMBODIMENTS

The display device with photosensors according to one embodiment of the present invention includes: a visible light source that radiates visible light to a pixel region; an invisible light source that radiates invisible light to the pixel region; a light source control circuit that turns on and off the invisible light source; first photosensors that detect an amount of received light when the invisible light source is on; second photosensors that detect an amount of received light when the invisible light source is off; a memory that has a first region and a second region, the first region storing first reference data obtained from each of the plurality of photosensors when the invisible light source is on, the second region storing second reference data obtained from each of the plurality of photosensors when the invisible light source is off. The display device with photosensors further includes: a calibration circuit that calibrates data obtained from the first photosensors and the second photosensors when the invisible light source is on and off, respectively, by using the data stored in the first region and the second region; and third photosensors that detect an amount of light reflected by an object to be scanned that is placed on the pixel region, by turning the invisible light source off and the visible light source on, and by turning only display pixels respectively nearest to the third photosensors within a prescribed range in the pixel region to be in a display state, and causing other display pixels within the range to be in a non-display state. Data obtained by the third photosensors is stored in one of the first region and the second region of the memory.

With this configuration, a memory region that is used to store reference data for calibrating data obtained from the first photosensors and the second photosensors when the invisible light source is on and off, respectively, can also be used to store data that is obtained from the third photosensors as a result of reading out an image of an object to be scanned. This is possible because the process to scan an image of the object to be scanned and the calibration process using the invisible light source are conducted independently from each other, and the memory is not used for the two processes at the same time. As a result, it becomes possible to provide a display device with photosensors that can realize a scanner function without increasing the capacity of the memory for storing data obtained by the third photosensors.

In the display device with photosensors, the memory may be configured to have a write mask in a region where the data obtained from the third photosensors is stored. In this case, it is preferable that the write mask be disabled only in a location where the data obtained from one of the third photosensors is to be stored in a single data writing process. This makes it possible to update data only in desired positions in the memory.

The display device with photosensors may further include an averaging circuit that obtains an average value of data that was obtained from the third photosensor in the first frame of two consecutive frames and that is stored in one of the first region and the second region, and data obtained from the third photosensor in the second frame of the two consecutive frames. In this case, it is preferable that the averaging circuit store the derived average data in one of the first region and the second region. This makes it possible to compensate for a small difference generated in read-out images due to a difference between two consecutive frames.

In the display device with photosensors, an infrared light source can be used as the invisible light source.

An image reading method of another embodiment of the present invention is an image reading method to obtain an image of an object to be scanned by a display device with photosensors having a plurality of photosensors in a pixel region. The display device with photosensors includes: a visible light source that radiates visible light to a pixel region; an invisible light source that radiates invisible light to the pixel region; a light source control circuit that turns on and off the invisible light source; first photosensors that detect an amount of received light when the invisible light source is on; second photosensors that detect an amount of received light when the invisible light source is off; a memory that has a first region and a second region, the first region storing first reference data obtained from each of the plurality of photosensors when the invisible light source is on, the second region storing second reference data obtained from each of the plurality of photosensors when the invisible light source is off, and a calibration circuit that calibrates data obtained from the first photosensors and the second photosensors when the invisible light source is on and off, respectively, by using the data stored in the first region and the second region. The image reading method includes: detecting an amount of light reflected by an object to be scanned that is placed on the pixel region, while only display pixels respectively nearest to the third photosensors within a prescribed range in the pixel region are caused to be in a display state, and other display pixels within the range are caused to be in a non-display state, with the invisible light source being off and the visible light source being on; and storing data obtained from the third photosensors in one of the first region and the second region of the memory.

In the image reading method, it is preferable that the memory have a write mask in a region where data obtained from the third photosensors is to be stored, and that the write mask be disabled only in a location where the data obtained from one of the third photosensors is to be stored in a single data writing process.

It is preferable that the image reading method further include: storing, in one of the first region and the second region, data obtained from the third photosensors in a first frame of two consecutive frames; deriving an average value of data obtained from the third photosensors in a second frame of the two consecutive frames and the data obtained in the first frame and stored in one of the first region and the second region; and storing the average value in one of the first region and the second region.

EMBODIMENTS

Specific embodiments of the present invention will be explained below with reference to figures.

Embodiment 1

Figure 1:
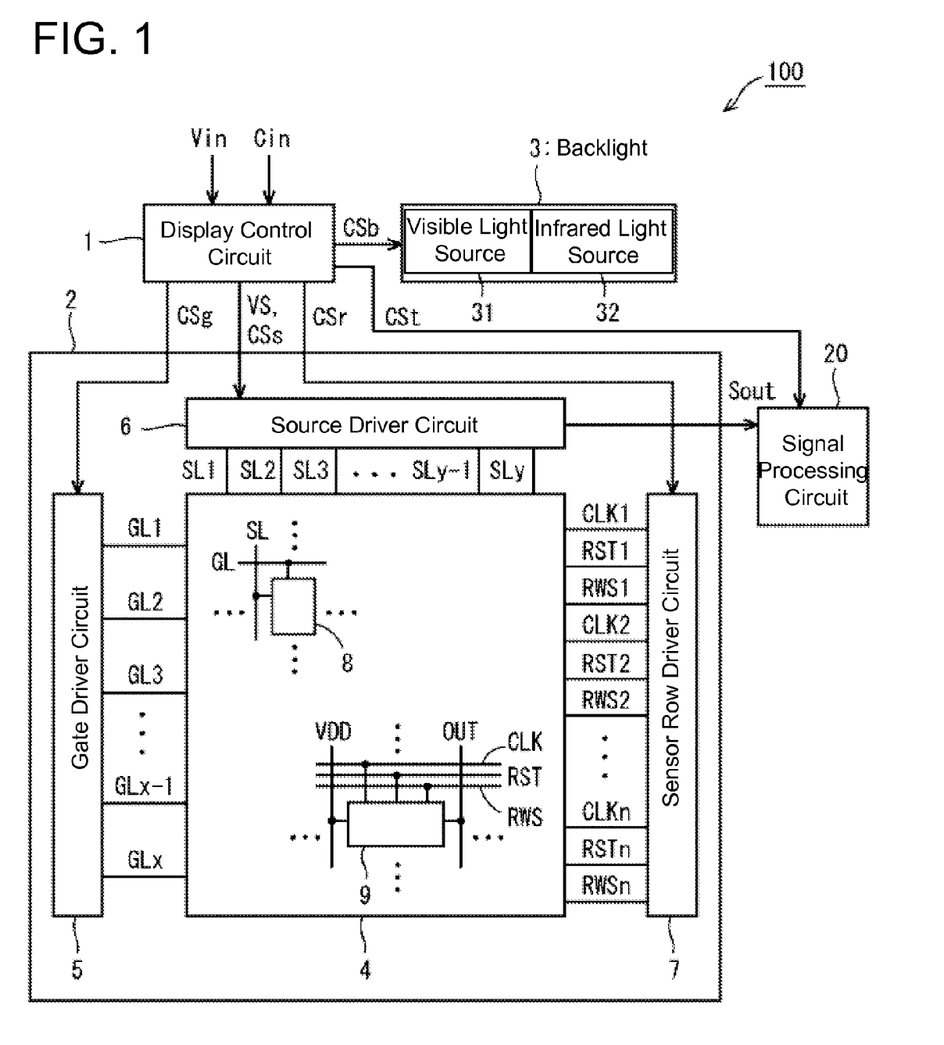
FIG. 1 is a circuit diagram showing a schematic configuration of a display device with photosensors according to one embodiment of the present invention.

FIG. 1 is a block diagram showing a schematic configuration of a liquid crystal display device 100 of Embodiment 1 of the present invention. The liquid crystal display device 100 shown in FIG. 1 includes a display control circuit 1, a display panel 2, and a backlight 3. The display panel 2 includes a pixel region 4, a gate driver circuit 5, a source driver circuit 6, and a sensor row driver circuit 7. The pixel region 4 includes a plurality of display pixel circuits 8 and a plurality of sensor pixel circuits 9. The liquid crystal display device 100 has a function of displaying an image in the display panel 2 and a function of detecting light incident on the display panel 2. In addition to the usage as a normal display device, the liquid crystal display device 100 can be used as a scanner by having the sensor pixel circuits 9 that detect light that was emitted from the backlight 3 and reflected at the surface of an object to be scanned, when the object to be scanned such as a document is placed on or close to the surface of the display panel 2. In the description below, "x," "y," "m," and "n" are integers.

The display device shown in FIG. 1 is supplied with an image signal Vin and a timing control signal Cin from the outside. Based on these signals, the display control circuit 1 outputs an image signal VS and control signals CSg, CSs, and CSr to the display panel 2, and outputs a control signal CSb to the backlight 3. The image signal VS may be the same as the image signal Vin, or may be a signal that is obtained by conducting a signal process on the image signal Vin. The display control circuit 1 supplies a signal processing circuit 20 with various timing signals CSt to control the timing of signal processes.

The backlight 3 is provided on the rear side of the display panel 2, and radiates light to the rear side of the display panel 2. The backlight 3 of the display device shown in FIG. 1 includes a visible light source 31 that emits visible light (white light, for example) and an infrared light source 32 that emits infrared light. The visible light source 31 is turned on when an image is displayed in the display panel 2 and when a document or the like is scanned. The infrared light source 32 is turned on when the display panel 2 is used as a touch panel and the like, and is turned off when sensor data for calibration (will be described later in detail) is obtained. The visible light source 31 and the infrared light source 32 are turned on and off by the control signal CSb.

In the pixel region 4 of the display panel 2, a plurality of display pixel circuits 8 and a plurality of sensor pixel circuits 9 are arranged in two-dimensional manner. More specifically, in the pixel region 4, "x" number of data lines GL1 to GLx and "y" number of source lines SL1 to SLy are disposed. The gate lines GL1 to GLx are disposed in parallel with each other, and the source lines SL1 to SLy are disposed in parallel with each other so as to intersect with the gate lines GL1 to GLx. The display pixel circuits 8 are disposed near respective intersections of the gate lines GL1 to GLx and the source lines SL1 to SLy. Each display pixel circuit 8 is connected to one gate line GL and one source line SL.

The display pixel circuits 8 are categorized into three types: for red color display, for green color display, and for blue color display. These three types of display pixel circuits 8 are arranged side by side along a direction in which the gate lines GL1 to GLx extend, thereby constituting a single color pixel.

As described later in detail, the sensor pixel circuits 9 include four types of sensor pixel circuits: sensor pixel circuits that detect light when the infrared light source 32 is on; sensor pixel circuits that detect light when the infrared light source 32 is off; sensor pixel circuits that detect light when the visible light source 31 is on; and sensor pixel circuits that are shielded from light so as not to receive light from the visible light source 31 or the infrared light source 32.

In the pixel region 4, "n" number of reset lines RST1 to RSTn and "n" number of read-out lines RWS1 to RWSn are disposed in parallel with the gate lines GL1 to GLx. Here, "n" is the number of sensor pixel circuits 9 along the vertical direction of the pixel region 4 shown in FIG. 1. Also, "m" is the number of sensor pixel circuits 9 along the horizontal direction of the pixel region 4. Each pair of reset line RST and read-out line RWS is connected to "m" number of sensor pixel circuits 9. A ratio of the number of display pixel circuits 8 (x×y) to the number of sensor pixel circuits 9 (m×n) can be appropriately determined.

The pixel region 4 may be provided with other signal lines or power lines (not shown) in parallel with the gate lines GL1 to GLx. When the sensor pixel circuits 9 are read out, a set of "m" number of source lines selected from the source lines SL1 to SLy are used as power lines VDD1 to VDDm, and another set of "m" number of source lines are used as output lines OUT1 to OUTm.

The gate driver circuit 5 drives the gate lines GL1 to GLx. More specifically, the gate driver circuit 5 sequentially selects one gate line out of the gate lines GL1 to GLx, based on the control signal CSg, and applies a high-level potential to the selected gate line, and a low-level potential to other gate lines. This way, "y" number of display pixel circuits 8 connected to the selected gate line are collectively selected.

The source driver circuit 6 drives the source lines SL1 to SLy. More specifically, the source driver circuit 6 applies potentials corresponding to the image signal VS to the source lines SL1 to SLy, based on the control signal CSs. The source driver circuit 6 may conduct line-sequential driving or dot-sequential driving. The potentials applied to the source lines SL1 to SLy are written in the "y" number of display pixel circuits 8 selected by the gate driver circuit 5. As described above, by writing potentials corresponding to the image signal VS into all of the display pixel circuits 8 through the gate driver circuit 5 and the source driver circuit 6, a desired image can be displayed in the display panel 2.

The sensor row driver circuit 7 drives the reset lines RST1 to RSTn, the read-out lines RWS1 to RWSn, and the like. The sensor row driver circuit 7 sequentially selects one reset line out of the reset lines RST1 to RSTn, based on the control signal CSr, and applies a high-level potential for resetting to the selected reset line RST and a low-level potential to other reset lines RST. This way, the sensor pixel circuits 9 connected to the reset line RST applied with a high-level potential are collectively reset.

The sensor row driver circuit 7 sequentially selects one read-out line out of the read-out lines RWS1 to RWSn, based on the control signal CSr, and applies a high-level potential for read-out to the selected read-out line and a low-level potential to other read-out lines RWS. This way, "m" number of sensor pixel circuits 9 connected to the selected read-out line RWS collectively become ready to be read out. The source driver circuit 6 applies a high-level potential to the power lines VDD1 to VDDm. This way, a signal that corresponds to an amount of light detected in each of the sensor pixel circuits 9 (referred to as a sensor signal below) is outputted to the output lines OUT1 to OUTm from the "m" number of sensor pixel circuits 9 that are ready to be read out.

The source driver circuit 6 includes a calculation circuit (not shown) that processes signals outputted from the sensor pixel circuits 9. The source driver circuit 6 amplifies an output from the calculation circuit, and outputs the amplified signal to the outside of the display panel 2 as a sensor output Sout. The sensor output Sout undergoes appropriate processes as needed in the signal processing circuit 20 provided outside of the display panel 2. As described above, by reading out sensor signals from all of the sensor pixel circuits 9 through the source driver circuit 6 and the sensor row driver circuit 7, light that entered the display panel 2 can be detected. An example in which the circuit that processes the sensor signals is incorporated in the source driver circuit 6 is shown here, but the circuit that processes the sensor signals may be provided outside of the source driver circuit 6.

Figure 2:
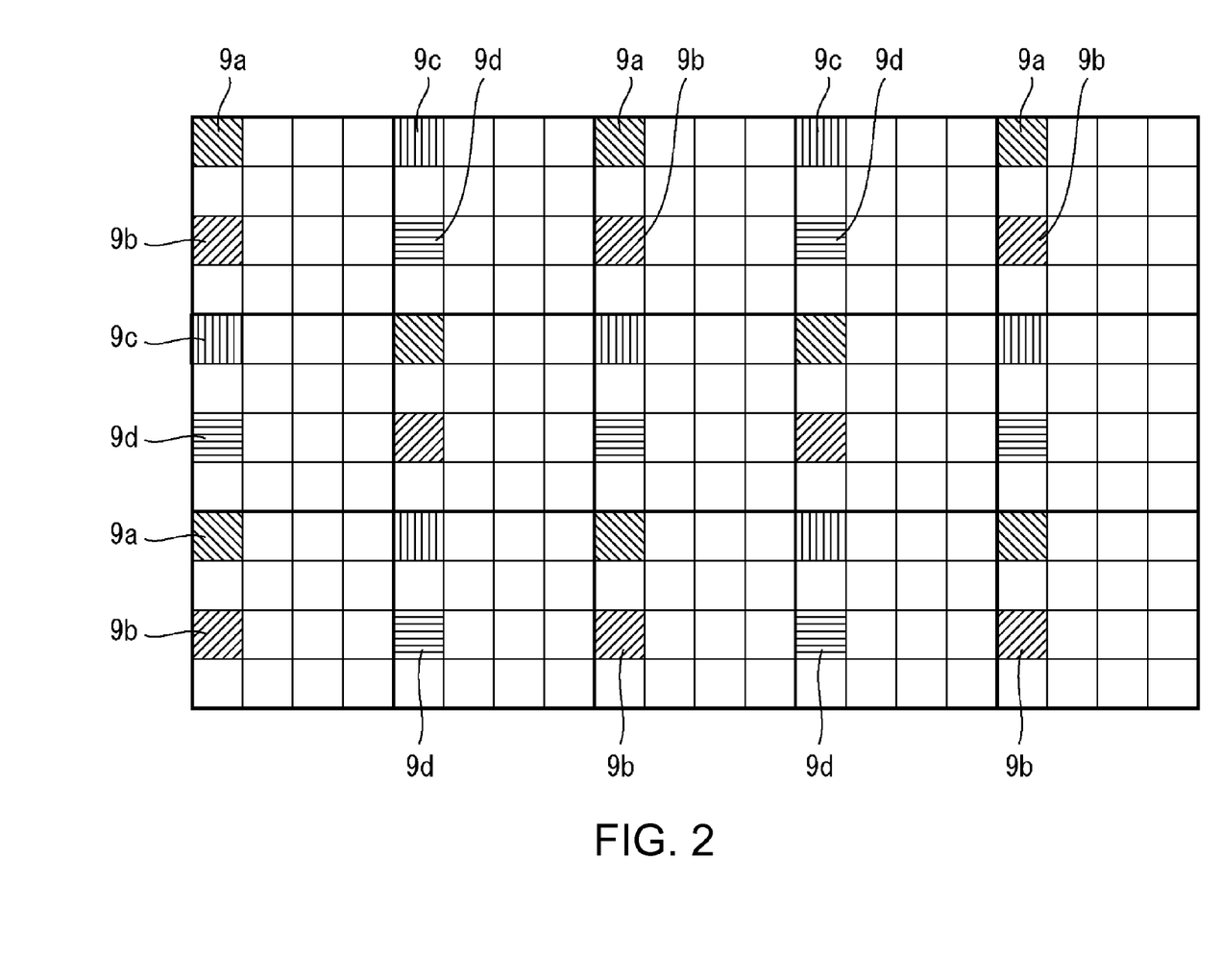
FIG. 2 is a schematic diagram showing an example of an arrangement of sensor pixel circuits in a pixel region in a display device with photosensors according to Embodiment 1.

FIG. 2 is a schematic diagram showing an example of an arrangement of the sensor pixel circuits 9 in the pixel region 4 of the liquid crystal display device 100. The arrangement example shown here is merely one specific example, and the ratio of the number of display pixel circuits 8 to the number of sensor pixel circuits 9, the locations of the sensor pixel circuits 9, and the like may be designed appropriately.

In the example shown in FIG. 2, a single rectangle represents a single color pixel region. As described above, in the present embodiment, a single color pixel region includes three display pixel circuits 8 for red color display, green color display, and blue color display. In FIG. 2, in each region indicated with diagonal lines running from the top left to the bottom right, a sensor pixel circuit 9a that detects light when the infrared light source 32 is on is disposed along with the three display pixel circuits 8. In each region indicated with diagonal lines running from the top right to the bottom left, a sensor pixel circuit 9b that detects light when the infrared light source 32 is off is disposed along with the three display pixel circuits 8. In each region indicated with the vertical lines, a sensor pixel circuit 9c that detects light when the visible light source 31 is on is disposed along with the three display pixel circuits 8. In each region indicated with the horizontal lines, a sensor pixel circuit 9d that is shielded from light so as not to receive light from the visible light source 31 or the infrared light source 32 is disposed along with the three display pixel circuits 8. In regions with no diagonal lines or the like, only display pixel circuits 8 are disposed.

The sensor pixel circuits 9a disposed in the same row are connected to the same reset line RST and read-out line RWS. The same is true for the sensor pixel circuits 9b, 9c, and 9d.

The sensor pixel circuits 9a that detect light when the infrared light source 32 is on and the sensor pixel circuits 9b that detect light when the infrared light source 32 is off are provided to achieve a touch panel function, which allows for a detection of an object such as a finger touching the display panel 2. The sensor pixel circuits 9c that detect light when the visible light source 31 is on are used as alternative sensors when the touch position detection using the infrared light source 32 cannot be conducted in an environment in which strong invisible light such as direct sunlight is incident from the outside, for example. In other words, in such a case, by turning off the infrared light source 32 and turning on the visible light source 31, and by having the sensor pixel circuits 9c detect a shadow of the contact object such as a finger, the touched position can be detected. In the present embodiment, the sensor pixel circuits 9c are also used to scan an image from the object to be scanned such as a document that is placed on the surface of the display panel 2.

When scanning an image, the infrared light source 32 is turned off. Because the visible light source 31 is also necessary for image display in the display panel 2, the visible light source 31 is constantly on, not only during the image scanning operation.

The sensor pixel circuits 9d shielded from light detect a dark current amount when no visible light or infrared light is received. The detection result of the sensor pixel circuits 9d is used to compensate for a change in sensor characteristics caused by a change in ambient temperature, time deterioration, and the like.

Figure 3:
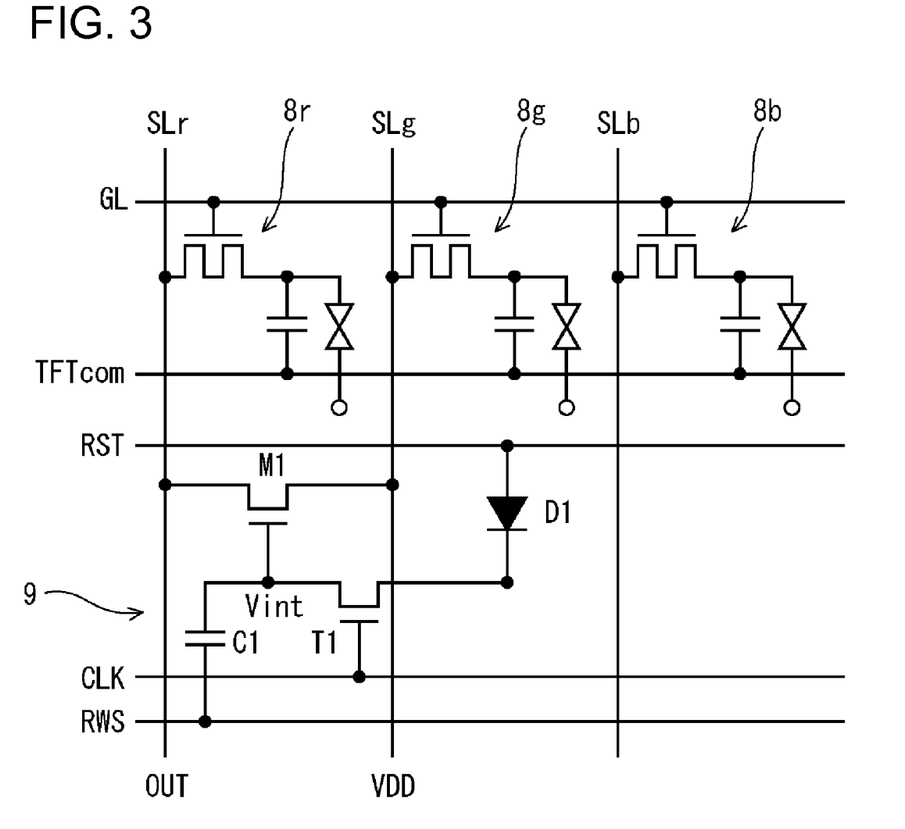
FIG. 3 is an equivalent circuit diagram showing an arrangement example of a display pixel circuit and a sensor pixel circuit.

FIG. 3 is an equivalent circuit diagram showing an arrangement example of the display pixel circuits 8 and the sensor pixel circuit 9. As shown in FIG. 3, in a single color pixel region, a display pixel circuit 8r for red color display, a display pixel circuit 8g for green color display, and a display pixel circuit 8b for blue color display are arranged. These display pixel circuits have the same configuration, and a red color filter, a green color filter, and a blur color filter are respectively provided in an opposite substrate.

The sensor pixel circuit 9 includes a photodiode D1, a transistor T1, a transistor M1, and a capacitor C1. In the configuration example shown in FIG. 3, the power line VDD connected to the source electrode of the transistor M1 doubles as a source line SLg that supplies a data signal to the display pixel circuit 8g for green color display. The output line OUT connected to the drain electrode of the transistor M1 doubles as a source line SLr that supplies a data signal to the display pixel circuit 8r for red color display.

The gate of the transistor T1 of the sensor pixel circuit 9 is connected to a clock signal line CLK. While a high-level potential is supplied to the clock signal line CLK, the transistor T1 of the sensor pixel circuit 9 is turned on, and the photodiode D1 is electrically connected to a storage node Vint, causing electrical charges corresponding to a photocurrent from the photodiode D1 to be accumulated in the capacitor C1.

(Touch Panel Operation)

The touch panel function achieved by the infrared light source 32 and the sensor pixel circuits 9a and 9b will be explained.

Figure 4:
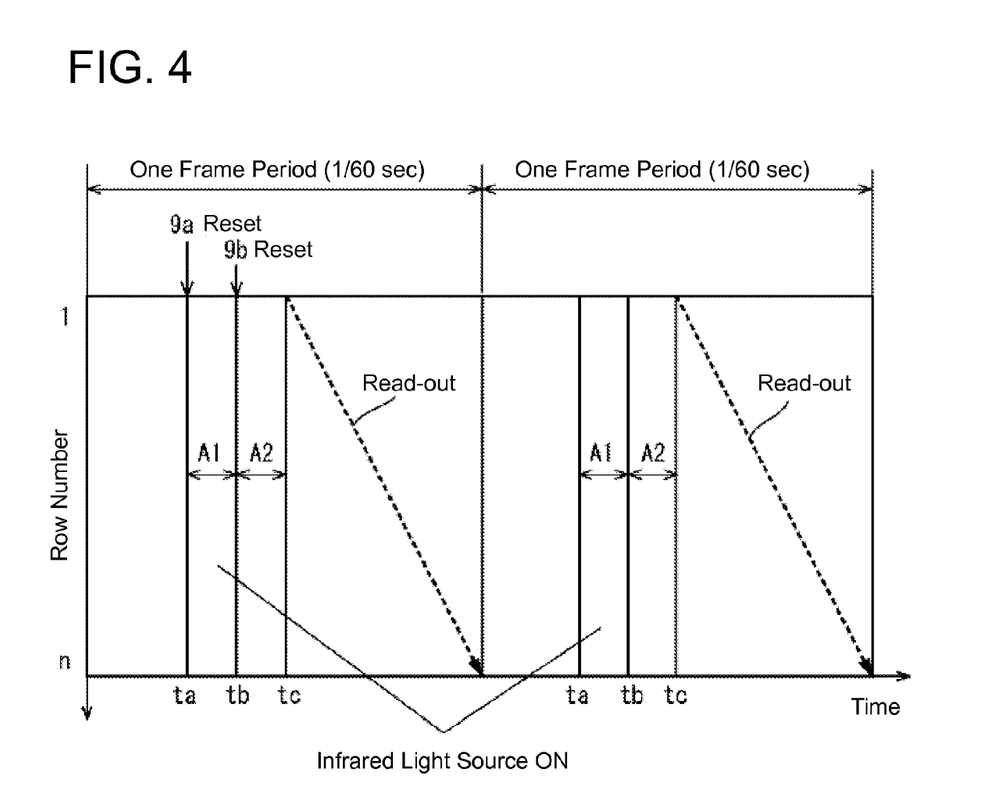
FIG. 4 is a timing chart that shows the timing of reset and read-out for a pair of sensor pixel circuits and the timing of turning on and off an infrared light source, to realize a touch panel function.
Figure 5:
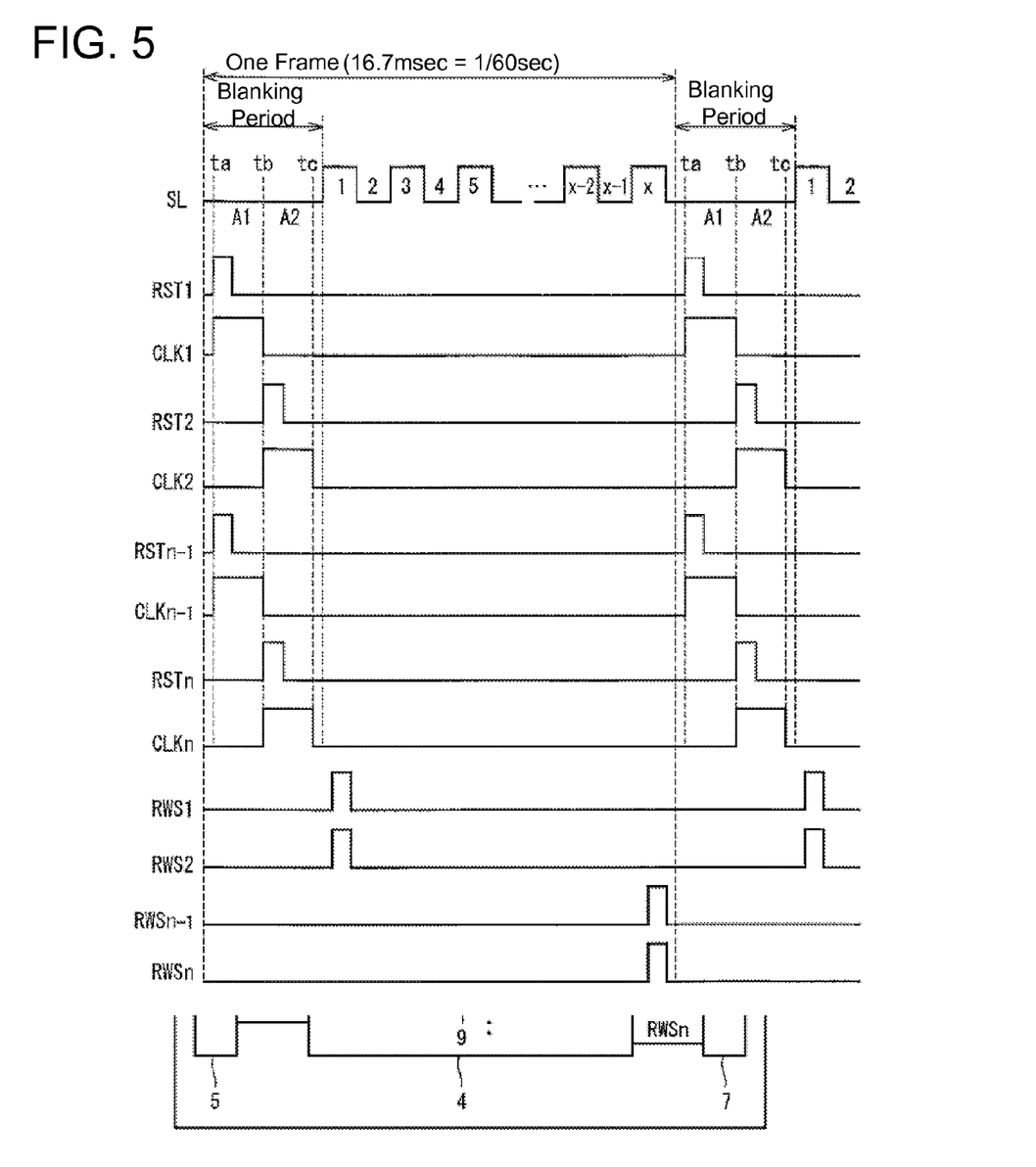
FIG. 5 is a timing chart showing an example of driving timing of a pair of sensor pixel circuits.

One sensor pixel circuit 9a and one sensor pixel circuit 9b form a pair. Locations of the sensor pixel circuits 9a and 9b that form a pair can be appropriately determined, but it is preferable that sensor pixel circuits 9a and 9b that are nearest to each other form a pair. For example, in the example of FIG. 2, a sensor pixel circuit 9a forms a pair with a sensor pixel circuit 9b that is located in a color pixel region that is in the same column as the sensor pixel circuit 9a and two rows down therefrom. Of the pair of sensor pixel circuits 9a and 9b, the sensor pixel circuit 9a detects light when the infrared light source 32 is on, and the sensor pixel circuit 9b detects light when the infrared light source 32 is off in the same frame period. FIG. 4 is a timing chart showing the timing of reset and read-out for the pair of the sensor pixel circuits 9a and 9b, and the timing of turning on and off the infrared light source 32. FIG. 5 is a timing chart showing an example of driving timing of a pair of the sensor pixel circuits 9a and 9b. In FIGS. 4 and 5, the period A1 (time ta to time tb) is a period in which the infrared light source 32 is turned on. At time ta, the sensor pixel circuits 9a are reset, and at time tb, the sensor pixel circuits 9b are reset. The sensor pixel circuits 9a and 9b are reset by supplying a high-level voltage to the respective circuits from the reset lines RST.

After being reset at time ta, each sensor pixel circuit 9a accumulates in the capacitor C1 a photocurrent generated by incident light during the period A1. That is, when the surface of the display panel 2 is touched by an object such as a finger, the infrared light that was emitted from the infrared light source 32 and reflected by the object is incident on the sensor pixel circuit 9a, and the sensor pixel circuit 9a accumulates charges corresponding to the received light amount in the capacitor C1. In other words, the period A1 is an accumulation period of the sensor pixel circuits 9a.

After being reset at time tb, each sensor pixel circuit 9b accumulates in the capacitor C1 a photocurrent generated by incident light during the period A2. During the period A2, the infrared light source 32 is turned off. The length of the period A2 is equal to the length of the period A1.

After time tc, a read-out signal is supplied to each of the sensor pixel circuits 9a and 9b through the read-out line RWS, and the charges accumulated in each of the sensor pixel circuits 9a and 9b are read out. As shown in FIG. 5, by supplying a read-out signal to the pair of sensor pixel circuits 9a and 9b at the same time, charges are read out from these sensor pixel circuits at the same time.

The charges that were read out from each of the sensor pixel circuits 9a and 9b are sent to the source driver circuit 6 from the output lines OUT, and after being amplified, are outputted to the signal processing circuit 20 as sensor signals Sout_a and Sout-b.

The sensor signal Sout_a from the sensor pixel circuit 9a is a signal obtained based on the light reflected by a finger or the like while the infrared light source 32 is on. The sensor signal Sout_b from the sensor pixel circuit 9b is a signal obtained based on the light reflected by a finger or the like while the infrared light source 32 is off. Therefore, by deriving a difference between the sensor signal Sout_a and the sensor signal Sout_b in the signal processing circuit 20, an infrared light component is removed from the ambient light, and it is possible to detect only a true infrared light component that was emitted by the infrared light source 32 and reflected by the object such as a finger.

In the signal processing circuit 20, it is necessary to define a white level and a black level as references for an output from each of the sensor pixel circuits 9a and 9b, in order to derive a gray level for each of the sensor signals Sout_a and Sout_b. The white level is the brightest gradation level. The black level is the darkest gradation level.

In the manufacturing process of the liquid crystal display device 100, the reference data described below is obtained for the sensor pixel circuits 9a and 9b, and the obtained reference data is stored in a non-volatile memory in the liquid crystal display device 100. The reference data is used for calibrating the outputs from the sensor pixel circuits 9a and 9b.

The white level reference data DON_W of the sensor pixel circuit 9a is obtained by mounting a reflective plate on the surface of the display panel 2, and by turning on the infrared light source 32. The black level reference data DON_B of the sensor pixel circuit 9a is obtained by placing the liquid crystal display device 100 in a black box to prevent reflection light from being generated, and by turning on the infrared light source 32.

The white level reference data DOFF_W of the sensor pixel circuit 9b is obtained by mounting a reflective plate on the surface of the display panel 2, and by turning off the infrared light source 32. The black level reference data DOFF_B of the sensor pixel circuit 9b is obtained by placing the liquid crystal display device 100 in a black box to prevent reflection light from being generated, and by turning off the infrared light source 32.

These four types of reference data are obtained for all of the sensor pixel circuits 9a and 9b. This is because the photodiodes D1 in the sensor pixel circuits 9a and 9b have individual differences in characteristics caused by the manufacturing conditions and the like.

By using the reference data, the gray level Ga of the sensor signal Sout_a and the gray level Gb of the sensor signal Sout_b can be derived from the formulae (1) and (2) below, for example. In the following formulae (1) and (2), the output from the sensor pixel circuit 9d that is shielded from light is not taken into consideration, but it is also possible to use a formula that takes into consideration the output from the sensor pixel circuit 9d so as to compensate for a characteristic change due to a change in ambient temperature and the like.

$$Ga = (Sout\_a - DON\_B)/(DON\_W - DON\_B) \quad (1)$$

$$Gb = (Sout\_b - DOFF\_B)/(DOFF\_W - DOFF\_B) \quad (2)$$

By calculating a difference between Ga and Gb, which were derived from the formulae (1) and (2) above, respectively, the noise due to an infrared light component included in ambient light can be removed, and a gray level based on the infrared light that was emitted from the infrared light source 32 and reflected by the object such as a finger can be accurately detected.

Figure 6:
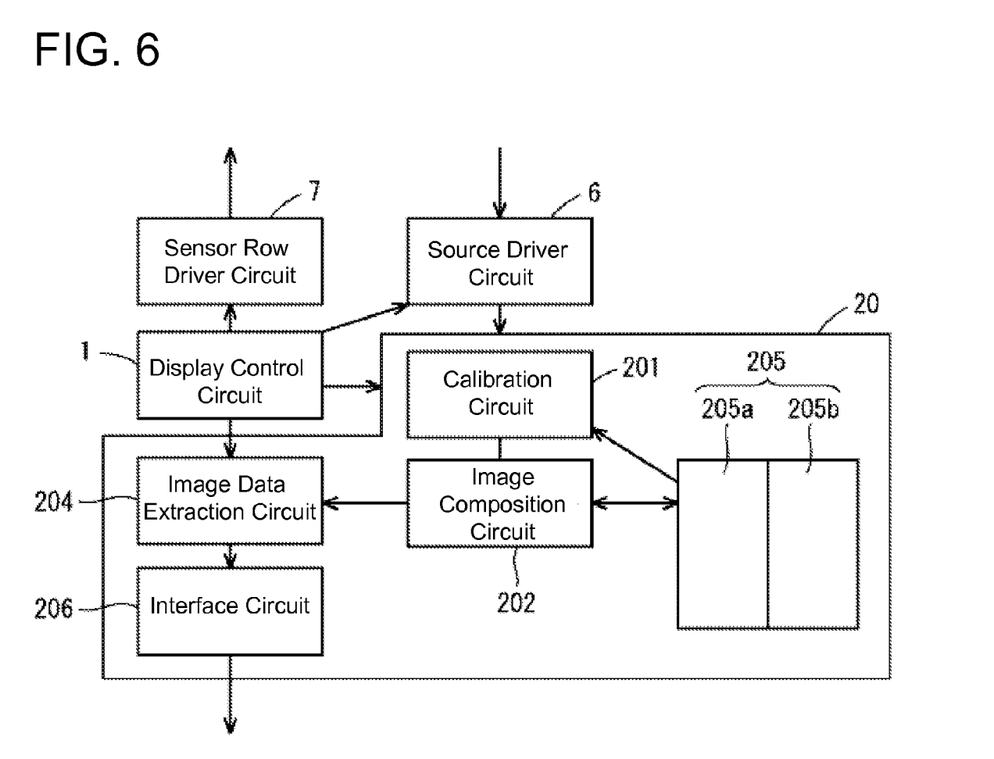
FIG. 6 is a block diagram showing a functional configuration for reading out sensor signals from sensor pixel circuits and a process conducted on the read-out signals in the display device of Embodiment 1.

FIG. 6 is a block diagram showing a functional configuration for reading out sensor signals from the sensor pixel circuits 9 and a process conducted on the read-out signals in the display device of the present embodiment. As shown in FIG. 6, in the display device of the present embodiment, as described above, the sensor row driver circuit 7 supplies a reset signal and a read-out signal to drive the sensor pixel circuits 9, based on the control signal CSr from the display control circuit 1, thereby causing the sensor signals to be read out from the sensor pixel circuits 9. The read-out sensor signals are amplified in the source driver circuit 6, and are sent to the signal processing circuit 20 as sensor outputs Sout.

As shown in FIG. 6, the signal processing circuit 20 includes a calibration circuit 201, an image composition circuit 202, an image data extraction circuit 204, a calibration memory 205, and an interface circuit 206. In this example, the calibration memory 205 and the interface circuit 206 are included in the signal processing circuit 20, but the memory and the circuit may be provided outside of the signal processing circuit 20.

The calibration memory 205 has regions 205a and 205b. The region 205a has a capacity to store the white level reference data DON_W and the black level reference data DON_B for all of the sensor pixel circuits 9a. The region 205b has a capacity to store the white level reference data DOFF_W and the black level reference data DOFF_B for all of the sensor pixel circuits 9b. As described above, the reference data is obtained during the manufacturing process, and is stored in a non-volatile memory (not shown) of the liquid crystal display device 100. When the liquid crystal display device 100 is turned on and the like, the reference data is read out from the non-volatile memory, and is stored in the calibration memory 205.

The calibration circuit 201 calibrates sensor outputs from the sensor pixel circuits 9a and 9b, respectively, based on the above-mentioned formulae (1) and (2), by using the reference data stored in the calibration memory 205 as described above. The gray levels Ga and Gb obtained as a result of the calibration are sent to the image composition circuit 202. The image composition circuit 202 composes an image that is used to detect coordinates of the position touched by the object such as a finger, by deriving the difference between the gray levels Ga and Gb in the manner described above for all of the sensor pixel circuits 9a and 9b.

The image data extraction circuit 204 detects coordinates of the position touched by the object such as a finger, based on the image composed by the image composition circuit 202. For example, if pixels having a gray level equal to or greater than a prescribed value are concentrated in a region that has at least a prescribed size, it is determined that the region is touched by an object such as a finger. The judgment result of the image data extraction circuit 204 is outputted to the outside from the interface circuit 206.

As described above, by turning on and off the infrared light source 32, and by deriving the difference in sensor outputs between the sensor pixel circuits 9a and 9b, the liquid crystal display device 100 can achieve a touch panel function of detecting an object such as a finger that touches the display panel 2.

(Scanning Operation)

Next, a scanning operation will be explained. In the scanning operation, an image is scanned from an object to be scanned by detecting reflection components resulting from the object to be scanned such as a document placed on the surface of the display panel 2 by the sensor pixel circuits 9c while the infrared light source 32 is off and the visible light source 31 is on. In the present embodiment, in order to obtain a clearer scan image, only one display pixel (color pixel) that is the nearest to each sensor pixel circuit 9c is caused to display the white level, and other display pixels are caused to display the black level. This way, only light that was emitted from the visible light source 31 and transmitted through each pixel in the white level display state is reflected by the object to be scanned, and is detected by the sensor pixel circuits 9c. More specifically, by making the three primary color display pixel circuits 8r, 8g, and 8b (see FIG. 3) of a single color pixel region display the highest level gradation, respectively, the color pixel region including the three primary color display pixel circuits 8r, 8g, and 8b is caused to display the white level.

In contrast, if all of the pixels that include color pixels that do not have a sensor pixel circuit 9c are caused to be in the white level display state in conducting the image scanning, for example, the light emitted from the visible light source 31 and transmitted through the pixels would be reflected at various positions on the object to be scanned. As a result, reflection light is incident on the sensor pixel circuit 9c from various directions, causing a scanned image to be unclear. This problem becomes more pronounced as the distance between the object to be scanned and the sensor pixel circuits 9c is made greater.

In the present embodiment, in a group of sensor pixel circuits 9c that is constituted of 64 sensor pixel circuits 9c (eight in the vertical direction (column direction) and eight in the horizontal direction (row direction)), color pixels nearest to the respective 64 sensor pixel circuits 9c are sequentially caused to be in the white color display state, and the read-out operation through sensors is conducted. In order words, in the present embodiment, by repeating the read-out operation 64 times in one frame, the read-out operation by all of the sensor pixel circuits 9c in the pixel region 4 is completed. The number of the sensor pixel circuits 9c included in one group is not limited to 64, and can be appropriately set depending on the necessary resolutions for image scanning and the like.

Before starting the scanning operation, white level reference data DV_W and black level reference data DV_B for the sensor pixel circuits 9c are read out and stored in the region 205a of the calibration memory 205. Because the sensor pixel circuits 9a and 9b are not used during the scanning operation, even if the reference data for the sensor pixel circuits 9a and 9b is stored in the calibration memory 205, such data can be overwritten. The white level reference data DV_W and the black level reference data DV_B for the sensor pixel circuits 9c are obtained during the manufacturing process and stored in a non-volatile memory in a manner similar to the reference data for the sensor pixel circuits 9a and 9b. Before the scanning operation is started, the white level reference data DV_W and the black level reference data DV_B for the sensor pixel circuits 9c are read out from the non-volatile memory, and are stored in the region 205a of the calibration memory 205.

The white level reference data DV_W for the sensor pixel circuits 9c is obtained by mounting a reflective plate on the surface of the display panel 2, turning the visible light source 31 on and turning the infrared light source 32 off, and causing all of the color pixels to be in the white level display state. The black level reference data DV_B for the sensor pixel circuits 9c is obtained by placing the liquid crystal display device 100 in a black box to prevent reflection light from being generated, turning the visible light source 31 on and turning the infrared light source 32 off, and causing all of the color pixels to be in the white level display state.

The white level reference data DV_W and the black level reference data DV_B for the sensor pixel circuits 9c obtained this way are stored in the non-volatile memory of the liquid crystal display device 100 as described above.

During the scanning operation, a read-out operation from each of the 64 sensor pixel circuits 9c included in one group is repeated 64 times, and images that were read out from all of the sensor pixel circuits 9c disposed in the pixel region 4 are combined as described above. This image composition process requires a memory, and for such a purpose, the region 205b of the calibration memory 205 is used.

In the present embodiment, the white level reference data DV_W and the black level reference data DV_B for the sensor pixel circuits 9c were stored in the region 205a of the calibration memory 205, and the data read out from the sensor pixel circuits 9c was stored in the region 205b. However, the regions in which respective types of data are stored may be switched to each other.

The white level reference data DV_W and the black level reference data DV_B for the sensor pixel circuits 9c are used to calibrate the sensor output data obtained from the sensor pixel circuits 9c. The sensor output data after calibration is stored in the region 205b of the calibration memory 205 as described above.

The calibration memory 205 is configured such that sensor output data from one sensor is written therein in a single writing process. The image composition circuit 202 controls the process to write data into the calibration memory 205. The data writing process into the calibration memory 205, which is controlled by the image composition circuit 202, will be explained in detail below.

Figure 7:
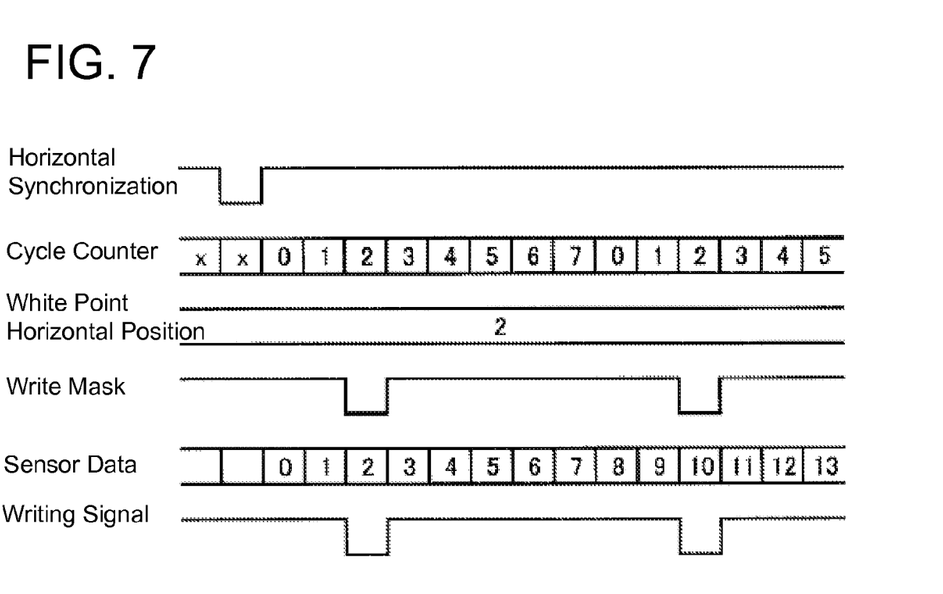
FIG. 7 is a timing chart (horizontal side) of a write mask process for a calibration memory when the display device of Embodiment 1 is used as a scanner.

FIG. 7 is a timing chart (horizontal side) of a write mask process for the region 205b of the calibration memory 205 when the display device of the present embodiment is used as a scanner. As shown in FIG. 7, the signal processing circuit 20 is provided with a cycle counter signal that repeatedly counts from 0 to 7 as one of the timing signals CSt from the display control circuit 1. This cycle counter signal is cleared in synchronization with the horizontal synchronization signal (indicated with "x" in FIG. 7). In the example of FIG. 7, a blanking period is not taken into consideration, but if there is a blanking period, the cycle counter signal may be cleared at the same time as when the data becomes active.

The white display position in FIG. 7 indicates a position of each color pixel displaying the white level, or in other words, a position of each sensor pixel circuit 9c that reads out an image. As shown in FIG. 7, if the white display position is each second sensor pixel circuit 9c in the horizontal direction out of a group of 64 sensor pixel circuits 9c that has eight lines in the horizontal direction, only at the position where the number of the white display position, which is "2," and the count value of the cycle counter signal coincide with each other, the write mask for the region 205b of the calibration memory 205 is disabled. In other words, as shown in FIG. 7, only at the positions where the cycle counter signal indicates "2," a writing signal (low-level signal in the example of FIG. 7) is generated. This way, the sensor output data of only one sensor pixel circuit 9c that corresponds to the white display position, out of eight sensor pixel circuits 9c arranged along the horizontal direction, is written into the region 205b of the calibration memory 205.

Although FIG. 7 only shows the timing of the write mask process in the horizontal direction, a similar mask signal can be generated for the vertical direction, and this way, the sensor output data obtained from each one of the 64 sensor pixel circuits 9c (8×8 array) can be written into the region 205b of the calibration memory 205 in synchronization with the cycle counter signal. As a result, by repeating the writing operation 64 times during one frame period, the sensor output data of all of the sensor pixel circuits 9c in the pixel region 4 can be stored in the region 205b. This way, scan images for one screen can be obtained.

Figure 8:
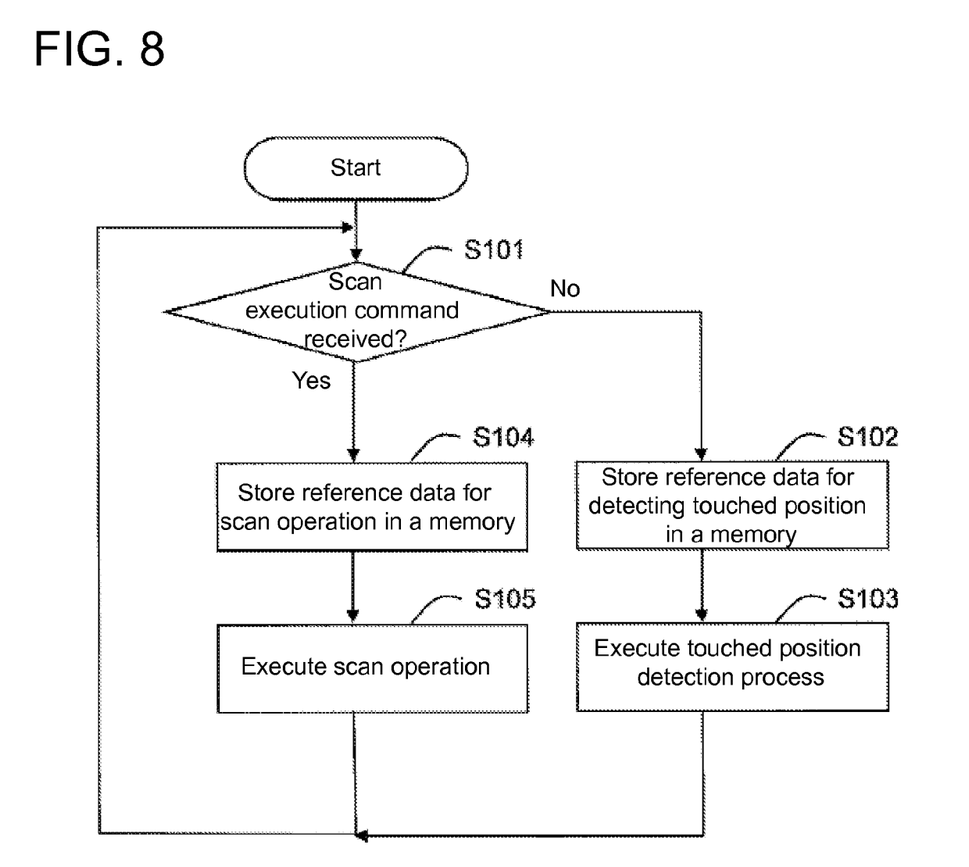
FIG. 8 is a flowchart that schematically shows a process to switch between a touch panel operation and a scanner operation in a liquid crystal display device of Embodiment 1.

FIG. 8 is a flowchart that schematically shows a process to switch between the touch panel operation and the scanning operation in the liquid crystal display device 100 of the present embodiment. As shown in FIG. 8, if no command to execute the scanning operation is received after being turned on (No in Step S101), the liquid crystal display device 100 reads out the white level reference data DON_W and the black level reference data DON_B, which are used for the calibration of the sensor pixel circuits 9a, from a non-volatile memory, and stores the data in the region 205a of the calibration memory 205. The liquid crystal display device 100 also reads out the white level reference data DOFF_W and the black level reference data DOFF_B, which are used for the calibration of the sensor pixel circuits 9b, and stores the data in the region 205b (Step S102).

The judgment on whether the command to execute the scanning operation was received or not in Step S101 can be made by determining whether or not the user has input a specific command or the like, or alternatively, by determining whether or not an object to be scanned such as a document is placed on the display panel 2 through a certain method (other sensors and the like, for example).

Thereafter, as shown in FIGS. 4 and 5, a process to detect a position touched by an object such as a finger is conducted based on the data obtained from the sensor pixel circuits 9a and 9b by turning on and off the infrared light source 32 (Step S103).

When the command to execute the scanning operation is inputted (in Step S101), the liquid crystal display device 100 reads out the white level reference data DV_W and the black level reference data DV_B, which are used for the calibration of the sensor pixel circuits 9c, from a non-volatile memory, and stores the data in the region 205a of the calibration memory 205 (Step S104).

Thereafter, in the state in which the infrared light source 32 is off and the visible light source 31 is on, sensor output data is sequentially obtained from the total of 64 sensor pixel circuits 9c (eight in the row direction and eight in the column direction), by causing a color pixel that is the nearest to each of the 64 sensor pixel circuits 9c to display the white level (Step S105). The sensor output data obtained from the sensor pixel circuits 9c is stored in the region 205b of the calibration memory 205.

When the scanning operation is completed, the process goes back to Step S102 through Step S101, and the reference data used for calibration of the sensor pixel circuits 9a and 9b is again read out from the non-volatile memory and stored in the region 205a and the region 205b of the calibration memory 205, respectively.

As described above, according to the present embodiment, image data (sensor output data) read out from the object to be scanned such as a document can be temporarily stored in the region 205b of the calibration memory 205. During the scanning operation, the reference data that is used for calibration of the sensor output data obtained from the sensor pixel circuits 9c is stored only in the region 205a. Therefore, the region 205b can be used as a region to store the sensor output data after calibration. In other words, in the present embodiment, it is not necessary to provide a memory for scan image composition in the scanning operation, and therefore, the memory capacity can be made smaller, which makes it possible to reduce the size of the device.

Embodiment 2

Below, Embodiment 2 of the present invention will be explained. Configurations described in Embodiment 1 are given the same reference characters, and descriptions thereof will not be repeated.

Figure 9:
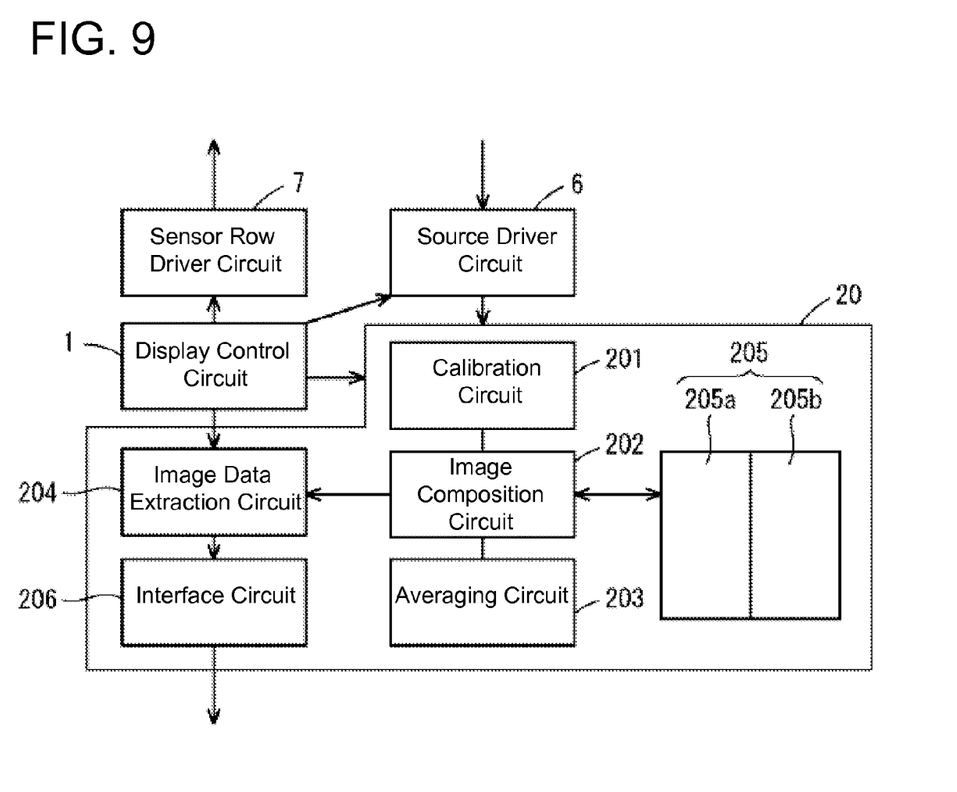
FIG. 9 is a block diagram showing a functional configuration for reading out sensor signals from sensor pixel circuits and a process conducted on the read-out signals in a display device of Embodiment 2.

FIG. 9 is a block diagram showing a functional configuration for reading out sensor signals from the sensor pixel circuits 9 and a process conducted on the read-out signals in a display device of Embodiment 2. As shown in FIG. 9, the display device of Embodiment 2 has the same configuration as the display device of Embodiment 1 except that an averaging circuit 203 is additionally provided.

In Embodiment 2, the averaging circuit 203 derives an average value of sensor output data between each odd-numbered frame and even-numbered frame, and the derived average value is written back into the region 205b of the calibration memory 205. In other words, in an even-numbered frame, when the sensor output data obtained from one sensor pixel circuit 9c is written into the region 205b of the calibration memory 205, the sensor output data obtained by the same sensor pixel circuit 9c in the preceding frame (odd-numbered frame) is read out from the region 205b. Thereafter, the averaging circuit 203 derives an average value of the read-out sensor output data and the sensor output data obtained in the current frame. The derived average value is written into the region 205b of the calibration memory 205 as the sensor output data of the even-numbered frame.

Figure 10:
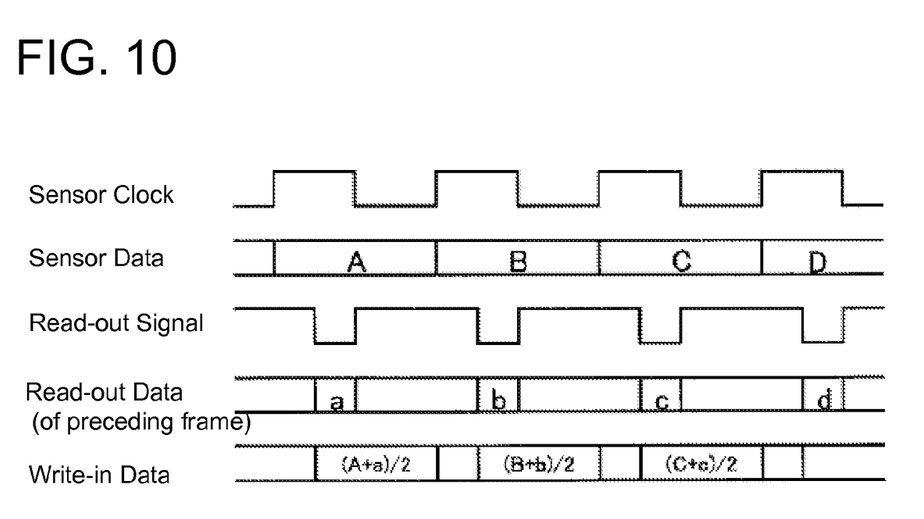
FIG. 10 is a timing chart of a process to derive an average value of sensor output data of each odd-numbered frame and sensor output data of each even-numbered frame in the display device of Embodiment 2.

For example, as shown in FIG. 10, if "A" is obtained as the sensor output data in an even-numbered frame, before writing the sensor output data "A" into the region 205b, the sensor output data "a" that was obtained from the same sensor pixel circuit 9c in the preceding frame is read out from the region 205b of the calibration memory 205. Then, "(A+a)/2," which is the average value of "A" and "a," is written into the region 205b.

As described above, according to the present embodiment, the average value of sensor output data of an odd-numbered frame and sensor output data of an even-numbered frame is written into the region 205b. This way, a small difference in read-out images caused by the difference between an odd-numbered frame and an even-numbered frame can be evened out. The difference between an odd-numbered frame and an even-numbered frame is caused by several factors such as the liquid crystal display device 100 being driven by AC driving. In other words, in the liquid crystal display device 100, in order to prevent the deterioration of liquid crystal, AC driving is typically conducted in which the polarities of the driving voltage supplied to the source lines are reversed in every frame. Because of the presence of a parasitic capacitance between the source lines and the sensor pixel circuits 9c, the reversal of the driving voltage affects the operation of the sensor pixel circuits 9c. In the present embodiment, the average value of sensor output data of an odd-numbered frame and sensor output data of an even-numbered frame is derived, and the sensor read-out image is composed based on the derived average values, which makes it possible to improve the image quality of the sensor read-out image.

The configurations described in the embodiments above are merely for illustrating specific examples, and not limiting the technical scope of the present invention. Any configuration can be employed as long as the effects of the present invention can be achieved.

For example, in the embodiments above, a liquid crystal display device was described as an example of the display device with photosensors, but any display device can be used as long as an image can be scanned by photosensors provided in the pixel region.

The invention claimed is:

1. A display device with photosensors incorporated therein, comprising:
a visible light source that radiates visible light to a pixel region;
an invisible light source that radiates invisible light to the pixel region;
a light source control circuit that turns on and off the invisible light source;
first photosensors that detect an amount of received light when the invisible light source is on;
second photosensors that detect an amount of received light when the invisible light source is off;
a memory that has a first region and a second region, the first region storing first reference data obtained from each of the first and second photosensors when the invisible light source is on, the second region storing second reference data obtained from each of the first and second photosensors when the invisible light source is off;
a calibration circuit that calibrates data obtained from the first photosensors and the second photosensors when the invisible light source is on and off, respectively, by using the data stored in the first region and the second region; and third photosensors that detect an amount of light reflected by an object to be scanned that is placed on the pixel region, by turning the invisible light source off and the visible light on, and by causing only display pixels respectively nearest to the third photosensors within a prescribed range in the pixel region to be in a display state and causing other display pixels within said range to be in a non-display state, wherein data obtained by the third photosensors is overwritten in one of the first region and the second region of the memory.

2. The display device with photosensors according to claim 1, wherein the memory has a write mask in a region where the data obtained by the third photosensors is to be stored, and wherein the write mask is disabled only in a position where data obtained from one of the third photosensors is to be stored in one data writing operation.

3. The display device with photosensors according to claim 1, wherein data obtained from the third photosensors in a first frame of two consecutive frames is stored in one of the first region and the second region, wherein the display device further comprises an averaging circuit that derives an average value of data obtained from the third photosensors in a second frame of the two consecutive frames and the data obtained in the first frame and stored in one of the first region and the second region, and wherein the averaging circuit stores the average value in one of the first region and the second region.

4. The display device with photosensors according to claim 1, wherein the invisible light source is an infrared light source.

5. An image reading method for obtaining an image of an object to be scanned by a display device with photosensors that has a plurality of photosensors in a pixel region, the display device with photosensors comprising:
a visible light source that radiates visible light to a pixel region;
an invisible light source that radiates invisible light to the pixel region;
a light source control circuit that turns on and off the invisible light source;
first photosensors that detect an amount of received light when the invisible light source is on;
second photosensors that detect an amount of received light when the invisible light source is off;
a memory that has a first region and a second region, the first region storing first reference data obtained from each of the first and second photosensors when the invisible light source is on, the second region storing second reference data obtained from each of the first and second photosensors when the invisible light source is off; and
a calibration circuit that calibrates data obtained from the first photosensors and the second photosensors when the invisible light source is on and off, respectively, by using the data stored in the first region and the second region, the image reading method comprising:
detecting an amount of light reflected by an object to be scanned that is placed on the pixel region, by turning the invisible light source off and the visible light source on, and by causing only display pixels respectively nearest to the third photosensors within a prescribed range in the pixel region to be in a display state and causing other display pixels within said range to be in a non-display state; and
overwriting data obtained from the third photosensors in one of the first region and the second region of the memory.

6. The image reading method according to claim 5, wherein the memory has a write mask in a region where the data obtained by the third photosensors is to be stored, and wherein the write mask is disabled only in a location where data obtained from one of the third photosensors is stored in one data writing operation.

7. The image reading method according to claim 5, further comprising:

storing, in one of the first region and the second region, data obtained from the third photosensors in a first frame of two consecutive frames;

deriving an average value of data obtained from the third photosensors in a second frame of the two consecutive frames and the data obtained in the first frame and stored in one of the first region and the second region; and storing the average value in one of the first region and the second region.

* * * * *